Nov. 25, 1952     E. C. WEISKOPF     2,619,233
SLIDE FILING MEANS
Filed Feb. 25, 1947     2 SHEETS—SHEET 1
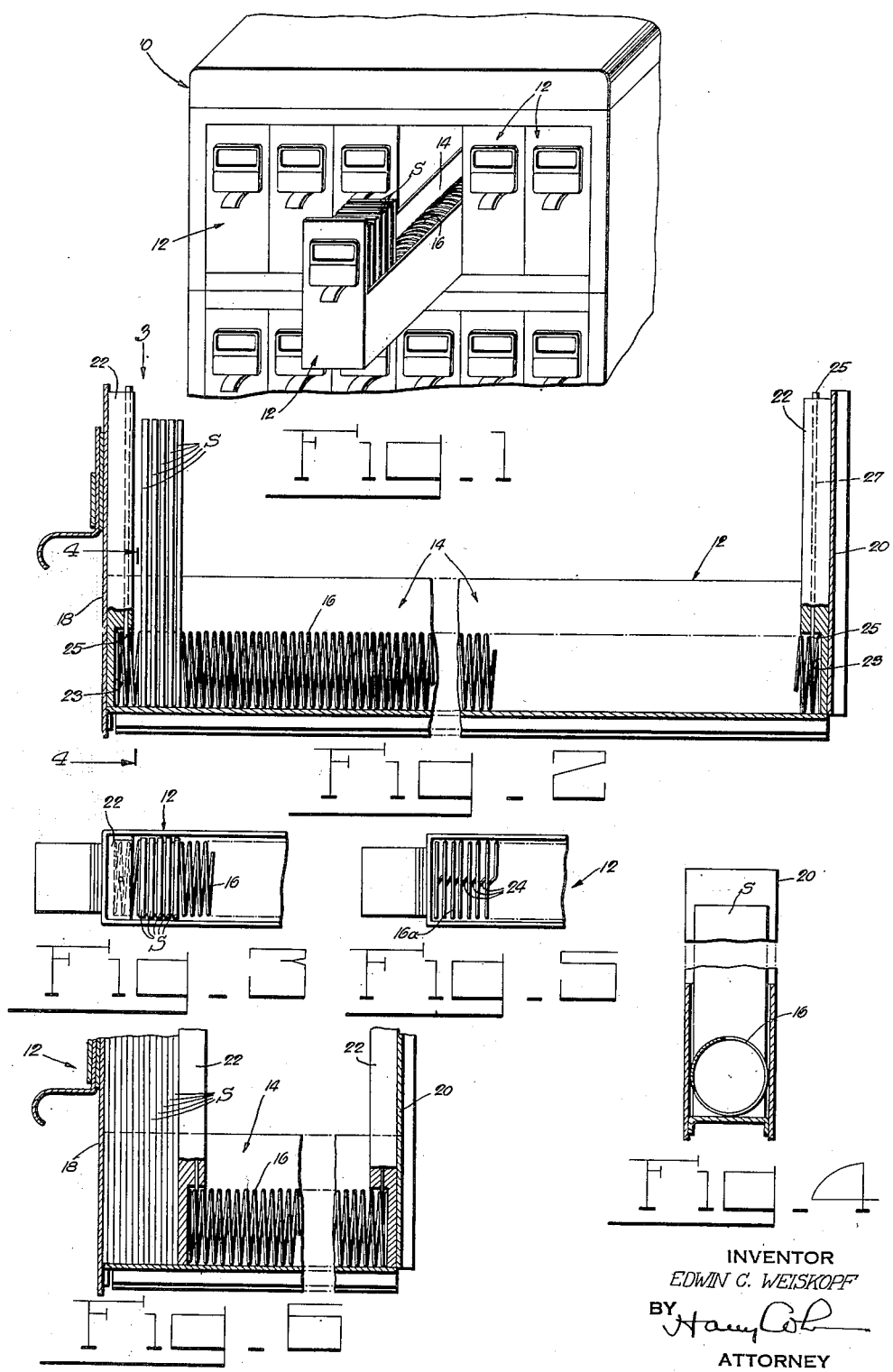
INVENTOR
EDWIN C. WEISKOPF
BY
ATTORNEY Nov. 25, 1952     E. C. WEISKOPF     2,619,233
SLIDE FILING MEANS
Filed Feb. 25, 1947     2 SHEETS—SHEET 2
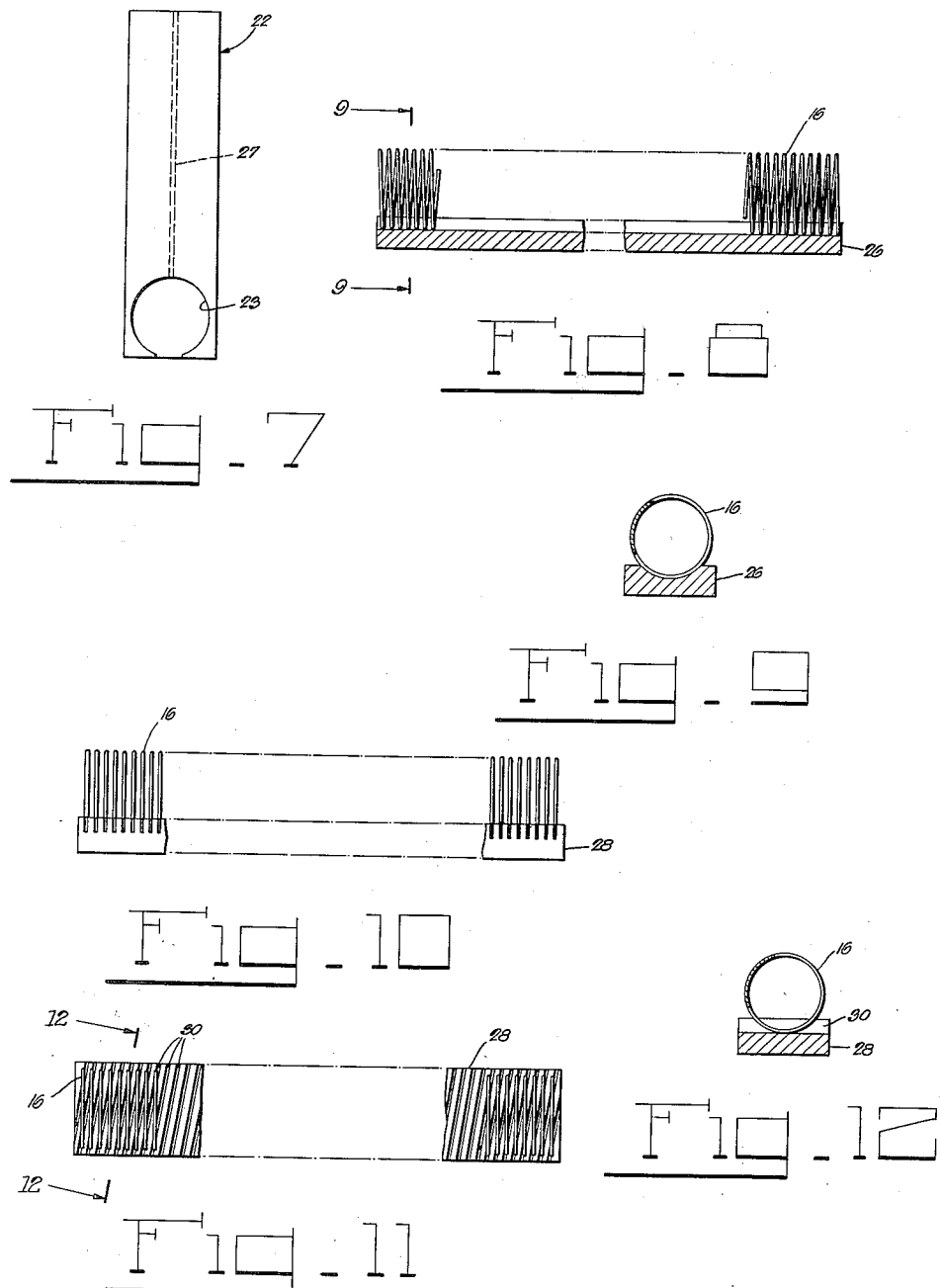
INVENTOR
EDWIN C. WEISKOPF
BY Harry Cohn
ATTORNEY Patented Nov. 25, 1952

2,619,233

UNITED STATES PATENT OFFICE 2,619,233

SLIDE FILING MEANS

Edwin C. Weiskopf, New York, N. Y., assignor to Technicon International, Ltd., New York, N. Y., a corporation of New York Application February 25, 1947, Serial No. 730,832

2 Claims. (Cl. 211—41)

This invention relates to means for filing microslides, and larger slides such as for example "Kodachrome" or colored slides, as well as conventional lantern slides.

The drawers of cabinets for filing micro-slides and other slides are ordinarily provided with means, known as "inserts," for holding the slides in spaced parallel relation, in the upright or vertical position thereof, so as to make visible the labels or markings on the various slides which are filed in the drawer, whereby to enable a particular slide to be located more easily than would be the case if the slides were disposed in abutting face-to-face relation in the cabinet drawer.

One object of the present invention is the provision of improved inserts and more particularly to provide an insert which is adapted to hold the slides in spaced relation but comparatively close to each other, with provision for affording relative movement of adjacent slides longitudinally of the drawer so as to provide for improved visibility of the labels or markings on the slides whereby to facilitate the location of a desired slide and to facilitate the mounting of the slides in the insert.

Another object of the invention is to provide an insert which eliminates or greatly reduces the breakage of slides which occurs not infrequently by reason of the slides of one drawer striking the slides in an adjacent drawer of the cabinet when a drawer is moved into or out of the cabinet.

A further object of the invention is the provision of an insert which provides increased slide filing capacity for the same length of drawer;

A further object is the provision of means which may be used either as a slide holder or as a stop for slides which are disposed in abutting relation in a receptacle;

A yet further object is generally to provide improved means for holding slides individually in upright position in a receptacle.

The above and other objects, features and advantages of the present invention will be fully understood from the following description considered in connection with the accompanying illustrative drawings.

In the drawings:

Fig. 1 is a perspective view of part of a sectional slide-filing cabinet embodying the present invention;

Fig. 2 is a longitudinal sectional view of one of the drawers or slide-receptacles of the cabinet, showing the insert partly in elevation and partly in section;

Fig. 3 is a top plan view at the forward part of Fig. 2;

Fig. 4 is a sectional view on the line 4—4 of Fig. 2, showing the insert in end elevation;

Fig. 5 is a view similar to Fig. 3 showing a modification;

Fig. 6 is a longitudinal sectional view of a cabinet drawer showing the use of the insert as an automatically adjustable stop for holding a plurality of slides in abutting face-to-face relation in which said slides may be disposed for storage purposes;

Fig. 7 is a view, in elevation, of an end member of the insert;

Fig. 8 is a side view of part of an insert showing another form of the invention;

Fig. 9 is a sectional view on the line 9—9 of Fig. 8;

Fig. 10 is a side view of an insert embodying another form of the invention;

Fig. 11 is a top view of the insert shown in Fig. 10;

Fig. 12 is a sectional view on the line 12—12 of Fig. 11.

Referring now to the drawings in detail, there is shown in Fig. 1 a filing cabinet 10 provided with a plurality of drawers 12 which may be of different widths for filing micro-slides or larger slides. Said cabinet is preferably of the construction illustrated and described in my Patent No. 2,364,409 and in my application Serial No. 582,521, filed March 13, 1945, issued July 3, 1951 as patent No. 2,559,203, but may be of another suitable construction.

The insert of the present invention for holding the micro-slides indicated at S for visible filing is indicated generally by the reference numeral 14. Said insert comprises a longitudinally extending helically wound metal spring which is disposed in the cabinet drawer or other longitudinally extending receptacle and extends longitudinally thereof. The drawer 12 selected for illustration is a drawer for filing micro-slides having a width of one inch so that the interior of the drawer is slightly wider than one inch. The helically wound spring 16 has a diameter of about one inch so as to fit within the narrowest drawer of the slide-filing cabinet, and the length of the spring is substantially equal to the interior length of the drawer when the spring is at ease, or in its normal relaxed condition, that is without compression or elongation of the spring. Preferably, as here shown end members 22 formed of any suitable material, for example of plastic, are provided at the opposite ends of spring 16. As here shown, each end member 22 has a circular recess 23 in which the end of the spring 16 is received, the diameter of said recess being slightly larger than the diameter of the spring. The end members are connected to the ends of the spring 16 by pins 25 which are inserted in openings 27 in said end members and which engage the adjacent ends, respectively, of the spring between adjacent convolutions thereof and thus retain the ends of the spring in said recesses. Pins 25 are preferably removable. Said end members 22 are preferably formed by molding the same from a suitable plastic, and are of different widths for drawers of various widths, the width of the end members being substantially the same as the width of the receptacle, while the spring 16 has substantially the same diameter irrespective of the width of the receptacle. When end members 22 are used the spring is shorter by an amount equal to the total thickness of the two end members.

The slides are mounted in insert 14 by disposing them in upright position in the spaces between adjacent convolutions of the spring 16. The pitch of spring 16 is very low so that the spring convolutions are substantially parallel to the end walls 18 and 20 of the receptacle whereby the slides, when mounted in the spaces between the convolutions of the spring are substantially parallel to the parallel faces of the end walls 18 and 20 of the drawer. However, as shown in Fig. 5 the spring 16A which corresponds to the spring 16 may have laterally offset connecting portions 24 between the adjacent convolutions so as to assure the parallelism of the slides in the drawer. In the relaxed condition of spring 16 or 16A, the convolutions are narrowly spaced from each other axially of the spring, the spaces, in which the slides are received, being substantially equal to the thickness of a standard microslide so that when a slide is inserted in the space between adjacent convolutions, the latter resiliently engage the opposite faces, respectively, of the slide and hold the latter in upright position as shown in Fig. 2. The wire may be of small thickness so that adjacent slides may be disposed in close relation with a narrow space therebetween. Although the slides are thus mounted in close relation, the upper portions which carry the identifying labels or markings may be moved apart while the slides are mounted in the spring.

In the construction shown in Figs. 8 and 9 the spring 16 is provided with a shallow base 26, said base is preferably of the width of the drawer in which the insert is placed, for example said base is about one inch wide for a drawer of one-inch slides, two inches wide for drawers for filing slides which are about two inches wide, etc., but the spring regardless of the width of its base may be of the same width, preferably the width of the narrowest drawer. Likewise it will be understood that when the spring is provided with the end members 22, as hereinbefore described, said end members will correspond approximately in width to the width of the drawer in which the insert is positioned while the spring 16 to which said end members are connected is of the width of the narrowest drawer.

In the form of the invention illustrated in Figs. 10 to 12 the spring 16 is mounted on a base 28 which is provided with shallow and narrow grooves 30 in which minor circumferential portions of the spring convolutions are received. Preferably said slots are at such an acute angle to the longitudinal line of the base, which is different than the pitch angle of the spring, that when the spring is mounted on the base with each convolution fitting between the companion walls of the groove, the major portions of the convolutions are in parallel relation with the ends of the receptacle.

It will be understood that it is within the scope of the present invention to omit the end members 22 and the base 26, although ordinarily said end members are desirable in the use of the inserts of the present invention. The insert may be provided with both the base and the end members. When the base is used, the thickness thereof is preferably small, say of the thickness of one-quarter of one inch.

It will be understood that since spring 16 is flexible and longitudinally compressible and expansible, the slides which are disposed in the spaces between the spring convolutions may be moved away from each other facewise at their upper portions where they are usually marked or labeled without disengaging the lower ends of the slides from the spring, thus improving the visibility of the upper parts of the slides so as to facilitate the location of a desired slide in the drawer of the cabinet. Also by reason of the flexibility of the spring and the longitudinal compressibility thereof, slides may be moved toward and away from each other longitudinally of the drawer to aid in locating an empty space for the insertion of a slide, which is desirable especially when the drawer is almost filled to its capacity or when it is desired to mount a slide in a particular place in the drawer in relation to other slides already mounted therein. Further in this connection, it will be noted that in the construction of Figs. 2 through 9, the spring convolutions are free of securement to the drawer bottom or to the base 26 so that said convolutions are displaceable longitudinally of the spring to permit bodily movement of the slides longitudinally of the drawer. The flexibility of the insert 14, derived from the flexibility of the spring which constitutes or forms the vital part of said insert also results in the substantial elimination of breakage of slides due to engagement of the slides of one drawer by the slides of an adjacent drawer when either drawer is moved into or out of the cabinet, since the flexibility of spring 16 allows the slide to yield and move sufficiently so as to clear the slides of an adjacent drawer during relative movement of two adjacent drawers of the cabinet. Further it will be observed that the spring 16 can be made of comparatively thin wire so that the slides may be mounted in close face-to-face relation thus increasing the capacity of the drawer without however detracting from the effective visibility of the slides, since as hereinbefore explained the slides may be moved away from each other facewise, if necessary in order to expose the markings on the upper parts of the slides when it is desired to locate a particular slide in the drawer and of course this is accomplished without removing the slides from the insert.

In Fig. 6 use of the insert 14 (without the base) as a stop for a plurality of slides in a drawer when the slides are mounted in abutting face-to-face relation is illustrated. As indicated in Fig. 6 a comparatively small number of slides S are stored in the cabinet drawer, and the insert is arranged in the drawer so that the slides are held resiliently against the front end wall 18 of the drawer. As more and more slides are stored in the drawer spring 16 of the insert is compressed and decreased in length to make room for additional slides. It will be understood however that the length of the spring 16 may be decreased as may be necessary to make room for additional slides as the capacity of the drawer is approached, and this may be easily accomplished by cutting off an end portion of the spring. If desired, slides may be mounted in the spring 16, when the insert is used as an automatically adjustable stop, so long as said spring is not fully compressed. Thus the device of the present invention, the base being omitted, may be used also as a combination slide-holder, for visible filing of slides, and automatically adjustable stop, in the same drawer or receptacle, for slides disposed in abutting face-to-face relation (storage filing).

It will be understood that various changes may be made in the details of the construction and the arrangements of the parts without departing from the underlying idea and principles of this invention within the scope of the appended claims.

Having thus described my invention, what I claim and desire to secure by Letters Patent, is:

1. In means for filing a multiplicity of microscope slides comprising a container provided with a bottom and side walls, a helical spring disposed in said container longitudinally between said side walls and held by the latter against substantial movement laterally of the spring axis, said spring having its convolutions arranged to resiliently engage the opposite sides of a microscope slide positioned between adjacent convolutions, the diameter of said spring being narrow in relation to the length of conventional microscope slides so that such slides are engaged only at their lower portions when the slides are vertically positioned in the container, said spring being supported by said bottom and the convolutions of a substantial length of said spring being free to move longitudinally of said drawer, when the slides are inserted between the adjacent spring convolutions, said convolutions being resiliently movable to positions in which they are inclined to said bottom of the container so that the adjacent slides can be moved to space their upper end portions away from each other to facilitate inspection of the slides while they are held by said spring in said container.

2. In means for filing a multiplicity of microscope slides comprising a container provided with a bottom and side walls, a helical spring disposed in said container longitudinally between said side walls and held by the latter against substantial movement laterally of the spring axis, said spring having its convolutions arranged to resiliently engage the opposite sides of a microscope slide positioned between adjacent convolutions, the diameter of said spring being narrow in relation to the length of conventional microscope slides so that such slides are engaged only at their lower portions when the slides are vertically positioned in the container, said spring being supported by said bottom and the convolutions of a substantial length of said spring being free to move longitudinally of said drawer, when the slides are inserted between the adjacent spring convolutions, said convolutions being resiliently movable to positions in which they are inclined to said bottom of the container so that the adjacent slides can be moved to space their upper end portions away from each other to facilitate inspection of the slides while they are held by said spring in said container, and members disposed in said drawer at the opposite ends, respectively, of said spring and having recesses in which the respective ends of the spring are received for holding the latter in position.

EDWIN C. WEISKOPF.

REFERENCES CITED

The following references are of record in the file of this patent:

UNITED STATES PATENTS

| Number | Name | Date |
|---|---|---|
| 11,504 | Woodbury | Aug. 8, 1854 |
| 642,277 | Adair | Jan. 30, 1900 |
| 1,470,549 | Steinmeyer | Oct. 9, 1923 |
| 1,487,942 | Hines et al. | Mar. 25, 1924 |
| 2,080,805 | Brey | May 18, 1937 |
| 2,118,239 | Smith | May 24, 1938 |
| 2,119,407 | Weiskopf | May 31, 1938 |
| 2,137,369 | Terry | Nov. 22, 1938 |
| 2,279,643 | Silver | Apr. 14, 1942 |
| 2,482,258 | Funk et al. | Sept. 20, 1949 |